(12) United States Patent
Masuyama

(10) Patent No.: US 9,715,190 B2
(45) Date of Patent: Jul. 25, 2017

(54) TONER CONVEYANCE ROLLER AND METHOD FOR MANUFACTURING TONER CONVEYANCE ROLLER

(71) Applicant: BRIDGESTONE CORPORATION, Tokyo (JP)

(72) Inventor: Toru Masuyama, Yokohama (JP)

(73) Assignee: BRIDGESTONE CORPORATION, Tokyo (JP)

( * ) Notice: Subject to any disclaimer, the term of this patent is extended or adjusted under 35 U.S.C. 154(b) by 0 days.

(21) Appl. No.: 14/771,548

(22) PCT Filed: Feb. 26, 2014

(86) PCT No.: PCT/JP2014/054664
§ 371 (c)(1),
(2) Date: Aug. 31, 2015

(87) PCT Pub. No.: WO2014/132996
PCT Pub. Date: Sep. 4, 2014

(65) Prior Publication Data
US 2016/0011541 A1    Jan. 14, 2016

(30) Foreign Application Priority Data
Mar. 1, 2013 (JP) ................................ 2013-040357

(51) Int. Cl.
*G03G 15/08* (2006.01)
*B29C 35/02* (2006.01)
(Continued)

(52) U.S. Cl.
CPC .......... *G03G 15/0808* (2013.01); *B29C 35/02* (2013.01); *G03G 15/0818* (2013.01);
(Continued)

(58) Field of Classification Search
CPC .......... G03G 15/0808; G03G 15/0818; G03G 2215/0869
(Continued)

(56) References Cited

U.S. PATENT DOCUMENTS 5,339,141 A * 8/1994 Suzuki ............... G03G 15/0818
399/285

FOREIGN PATENT DOCUMENTS

JP          9-297512 A      11/1997
JP         11-316496 A      11/1999
(Continued)

OTHER PUBLICATIONS

Extended European Search Report dated Jan. 29, 2016 from European Patent Office in counterpart Application No. 14756495.9.
(Continued)

*Primary Examiner* — Benjamin Schmitt
(74) *Attorney, Agent, or Firm* — Sughrue Mion, PLLC

(57) ABSTRACT

A toner conveyance roller for an image forming apparatus including a toner image forming mechanism including a developing roller and the toner conveyance roller which is arranged opposite to the developing roller and used for supplying and scraping toner, wherein the toner conveyance roller has a roller part and a shaft part, the roller part includes a substantially cylindrical elastic layer composed of an elastic foaming body on a surface of the roller part, and a density of the elastic layer is higher in a longitudinal center part of the roller part than in both longitudinal end parts thereof, and a method for manufacturing the toner conveyance roller including a step of heat-pressing the crown-shaped elastic foaming body, and thereby, forming the elastic layer.

6 Claims, 4 Drawing Sheets

(51) Int. Cl.
- *B29C 70/72* (2006.01)
- *B29K 75/00* (2006.01)
- *B29K 105/04* (2006.01)
- *B29L 31/32* (2006.01)
- *B29L 31/00* (2006.01)

(52) U.S. Cl.
CPC .......... *B29C 70/72* (2013.01); *B29K 2075/00* (2013.01); *B29K 2105/04* (2013.01); *B29L 2031/324* (2013.01); *B29L 2031/767* (2013.01); *G03G 2215/0869* (2013.01)

(58) Field of Classification Search
USPC ............ 399/265, 279, 281, 286; 492/56, 59
See application file for complete search history.

(56) References Cited

FOREIGN PATENT DOCUMENTS

| | | | | |
|---|---|---|---|---|
| JP | 2000-275953 A | 10/2000 | | |
| JP | 2003-103534 A | 4/2003 | | |
| JP | 2003-103535 A | 4/2003 | | |
| JP | 2003-107895 A | 4/2003 | | |
| JP | 2003103535 A | * | 4/2003 | ............ B29C 39/10 |
| JP | 2003-156930 A | 5/2003 | | |
| JP | 2003-177600 A | 6/2003 | | |
| WO | 2012/081626 A1 | 6/2012 | | |

OTHER PUBLICATIONS

International Search Report for PCT/JP2014/054664 dated May 27, 2014.

English Translation for Japanese Patent Publication No. 2003-107895, published on Apr. 9, 2003.

English Translation for Japanese Patent Publication No. 2003-103535, published on Apr. 9, 2003.

English Translation for Japanese Patent Publication No. 2000-275953, published on Oct. 6, 2000.

English Translation for Japanese Patent Publication No. 9-297512, published on Nov. 18, 1997.

* cited by examiner

TONER CONVEYANCE ROLLER AND METHOD FOR MANUFACTURING TONER CONVEYANCE ROLLER

CROSS REFERENCE TO RELATED APPLICATIONS

This application is a National Stage of International Application No. PCT/JP2014/054664 filed Feb. 26, 2014, claiming priority based on Japanese Patent Application No. 2013-040357 filed Mar. 1, 2013, the contents of all of which are incorporated herein by reference in their entirety.

TECHNICAL FIELD

The present invention relates to a toner conveyance roller and a method for manufacturing the same used for an image forming apparatus such as a copying machine and a printer.

BACKGROUND ART

Conventionally, for an image forming apparatus such as a copying machine and a printer, the following process has been adopted. Namely, it is the process in which (1) the surface of a photoreceptor (image forming body) is uniformly charged by charging means such as a charging roller, (2) an image is projected onto the photoreceptor from an optical system having a laser irradiation unit and the like to erase a charge in a portion of the photoreceptor that is exposed, and thereby, to form a latent image, (3) toner is supplied to the latent image on the photoreceptor with a developing roller and the like to form a toner image, (4) the toner image is transferred to a recording medium by transferring means, for example, of giving charge from the backside of the recording medium such as paper, and (5) the transferred toner image on the recording medium is fixed by fixing means such as heat and pressure thereby to form a printed image.

In such a process, a mechanism for forming the toner image in item (3) (developing mechanism) is performed, for example, by a mechanism including a developing roller 2 which opposes a photoreceptor drum 3 holding the latent image so as to come into contact with or close to the same, and a toner conveyance roller 1 which opposes the developing roller 2 so as to come into contact with or close to the same and is arranged so as to be in contact with a toner reservoir in a toner cassette as shown in FIG. 4. In the mechanism in FIG. 4, when the individual rollers rotate in the respective directions of the arrows, toner 5 is conveyed by the toner conveyance roller 1 and supplied onto the surface of the developing roller 2. The toner 5 is formed into a uniform thin film by a stratification blade 4. The developing roller 2 having the thin film of the toner 5 on the surface comes into contact with or close to the photoreceptor drum 3 and rotates, and thereby, the toner 5 sticks to the latent image on the photoreceptor drum 3 to form (develop) the toner image.

As mentioned above, the toner conveyance roller is for conveying the toner from the toner reservoir and supplying it onto the developing roller, and for scraping and recovering the toner that is not used and remains on the surface of the developing roller. As the toner conveyance roller, a roller having an elastic foaming body layer on the surface is typically used. A property of conveying toner and properties of supplying and scraping toner in the toner conveyance roller are noticeable performance to obtain a toner image with high quality in the developing mechanism, and conventionally, development of a toner conveyance roller having the excellent performance has been under progress. For example, according to Patent Literature 1, there is developed a roller in which the shape of cells of an elastic layer constituting the roller is set into a shape compressed in the radial direction of the roller in order to secure the nip width between a toner conveyance roller and a developing roller and allow toner not to stick still to the surface of the roller, and the number of cells on the surface of the elastic layer is more than the number of cells inside. Moreover, according to Patent Literature 2, there is developed a toner conveyance roller in which the rotation shaft is set to have a crown shape (drum shape) to allow a foaming body to be a crown shape with a uniform thickness in order to obtain a sufficient property of scraping toner with a property of conveying toner maintained.

PRIOR ART LITERATURE

Patent Literature

Patent Literature 1: Japanese Patent Laid-Open No. 9-297512
Patent Literature 2: Japanese Patent Laid-Open No. 11-316496

SUMMARY OF INVENTION

Problems to be Solved by the Invention

In the above-mentioned developing step, when the toner conveyance roller supplies toner to the developing roller, the toner conveyance roller is pressed onto the developing roller with a certain nip width (contact width of the two rollers). It is known that in this stage, the shaft of the toner conveyance roller tends to bend, so that pressing force of the toner conveyance roller with respect to the center part of the developing roller is weaker than with respect to the longitudinal end part thereof. In this case, there is a case where properties of supplying and scraping toner in the toner conveyance roller deteriorate more in the longitudinal center part of the developing roller as compared with the longitudinal end part thereof, which causes image quality to deteriorate. In particular, a need for image quality is growing in recent years and a toner conveyance roller that does not cause such a problem is desired.

Here, according to the crown-shaped toner conveyance roller in which the outer diameter in the longitudinal center part is larger than the outer diameter in the end part as disclosed in Patent Literature 2, the pressing force in the center part increases, which leads to a possibility of solving the above-mentioned problem. However, since the toner conveyance roller typically has lower hardness as compared with those of the other rollers, a crown amount (difference between the diameters of the roller in the longitudinal end part and center part) is needed to be large in order to obtain the above-mentioned effect, and thus, the maximum diameter of the roller is to largely increase. In view of downsizing and space-saving of the apparatus, such increase of the maximum diameter of the roller is not desired.

Accordingly, an object of the present invention is to provide a toner conveyance roller which is a toner conveyance roller having an elastic foaming body layer on the surface and with which properties of supplying toner and scraping toner with respect to a developing roller are improved without the maximum diameter of the roller largely increased, and a method for manufacturing the toner conveyance roller.

Means for Solving the Problems

The above-mentioned object is achieved by a toner conveyance roller for an image forming apparatus including a toner image forming mechanism including a developing roller and the toner conveyance roller which is arranged opposite to the developing roller and used for supplying and scraping toner, wherein the toner conveyance roller has a roller part and a shaft part, the roller part includes a substantially cylindrical elastic layer composed of an elastic foaming body on a surface of the roller part, and a density of the elastic layer is higher in a longitudinal center part of the roller part than in both longitudinal end parts thereof. By doing so, when the toner conveyance roller is pressed onto the developing roller, even in the case where the shaft of the toner conveyance roller bends, the difference between pressing force with respect to the longitudinal end part of the developing roller and pressing force with respect to the longitudinal center part thereof in the toner conveyance roller can be made small. Moreover, according to the toner conveyance roller of the present invention, a crown shape with the maximum diameter largely increased is not needed and space-saving can be achieved.

Preferable aspects of a method for manufacturing the roller of the present invention are as follows.

(1) The density ratio ($D_c/D_e$) of the density ($D_c$) of the elastic layer in the longitudinal center part of the roller part relative to the density ($D_e$) of the elastic layer in both the longitudinal end parts thereof is within a range of 104 to 126%. By doing so, the difference between the pressing force with respect to the longitudinal center part of the developing roller and the pressing force with respect to the longitudinal end part thereof in the toner conveyance roller can be further made small.

(2) In item (1), the density ($D_e$) is the average density of the elastic layer in each 50 mm of both the longitudinal end parts of the roller part, and the density ($D_c$) is the average density of the elastic layer in 50 mm of the longitudinal center part of the roller part.

(3) The elastic layer is a layer composed of polyurethane foam.

Moreover, the object of the present invention is achieved by a method for manufacturing the toner conveyance roller of the present invention, the method including: a step of processing an elastic foaming body for forming the elastic layer of the roller part into a crown shape in which an outer diameter in the longitudinal center part is larger than an outer diameter in both the longitudinal end parts; and a step of press-fitting the crown-shaped elastic foaming body into a substantially cylindrical tubular body, and after heating the tubular body, taking out the elastic foaming body to form the elastic layer. By heat-pressing the crown-shaped elastic foaming body to form the elastic layer of the roller part into the substantially cylindrical shape, the toner conveyance roller of the present invention can be easily manufactured in which the density of the elastic layer is higher in the longitudinal center part of the roller part than in both the longitudinal end parts thereof.

In the manufacturing method of the present invention, the crown amount of the crown shape of the elastic foaming body (difference between the outer diameter of the elastic foaming body in both the longitudinal ends and the outer diameter thereof in the longitudinal center) is preferably 0.2 to 0.8 mm. Thereby, the difference between the density of the elastic layer in both the longitudinal end parts of the roller part and the density in the longitudinal center part thereof can be set to be within a preferable range.

Effects of Invention

According to the toner conveyance roller of the present invention, without setting the crown shape to have the maximum diameter largely increased, even in the case where the shaft of the toner conveyance roller bends when being pressed onto the developing roller, the difference between the pressing force with respect to the longitudinal end part of the developing roller and the pressing force with respect to the longitudinal center part thereof can be made small. Hence, properties of supplying toner and scraping toner with respect to the developing roller are improved. Accordingly, by using the toner conveyance roller of the present invention, image quality of an image forming apparatus can be improved without a space due to the roller increased. Moreover, according to the method for manufacturing the toner conveyance roller of the present invention, the toner conveyance roller of the present invention can be easily manufactured.

MODE FOR CARRYING OUT THE INVENTION

Figure 4:
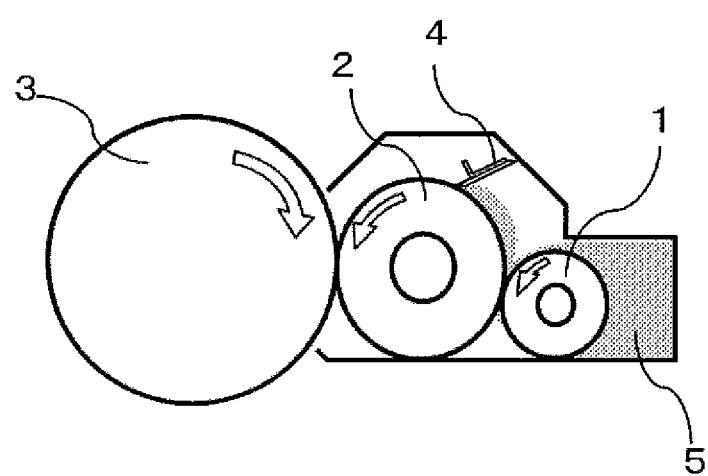
FIG. 4 is a schematic cross-sectional view explaining an example of a developing mechanism using a toner conveyance roller in a process of an image forming apparatus.

The present invention is the invention of a toner conveyance roller for an image forming apparatus including a toner image forming mechanism including a developing roller and the toner conveyance roller which is arranged opposite to the developing roller and used for supplying and scraping toner as shown in FIG. 4.

Figure 1:
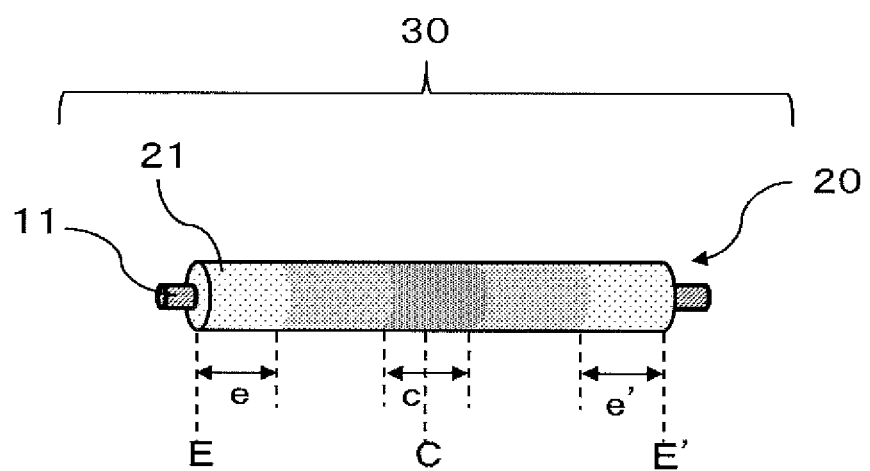
FIG. 1 is a schematic perspective view showing a representative example of a toner conveyance roller of the present invention.

Hereafter, an embodiment of the toner conveyance roller of the present invention is described with reference to the drawings. FIG. 1 is a schematic perspective view showing a representative example of the toner conveyance roller of the present invention. As shown in the figure, a toner conveyance roller 30 of the present invention includes a shaft part 11 and a roller part 20, and the roller part 20 has an elastic layer 21 composed of an elastic foaming body on the surface. The shaft part 11 and the roller part 20 may be adhesively fixed together with an adhesive layer (not shown). Moreover, the roller part 20 is sufficient to have the elastic layer 21 on the surface, and may have another layer such as a rubber layer inside (not shown). Further, the density of the elastic layer 21 is higher in a longitudinal center part of the roller part 20 (region c near the longitudinal center C) than in both longitudinal end parts thereof (regions e and e' near both longitudinal ends E and E'). As mentioned above, in the case where the density of the elastic layer is the same over the whole area of the roller part, when the toner conveyance roller is pressed onto the developing roller, the shaft part of the toner conveyance roller bends, and pressing force with respect to the longitudinal center part of the developing roller tends to be smaller than pressing force with respect to the longitudinal end part thereof. According to the toner conveyance roller 30 of the present invention, as represented by Examples mentioned later, when the toner conveyance roller 30 is pressed onto the developing roller, even in the case where the shaft part 11 bends, the difference between the pressing force with respect to the longitudinal end part of the developing roller and the pressing force with respect to the longitudinal center part thereof can be made small. This is considered as that the difference in pressing force is made small since the modulus of elasticity of the center part becomes relatively high by making the density of the elastic layer 21 higher in the center part of the roller part 20 as compared with the longitudinal end part thereof. As the difference in pressing force of the elastic layer 21, as represented by Examples mentioned later, the ratio of the pressing force in the longitudinal center part relative to the pressing force in the longitudinal end part is preferably 89 to 103%. Thereby, image quality can be further improved. The ratio of the pressing force in the longitudinal center part relative to the pressing force in the longitudinal end part is further preferably 89 to 100%, particularly preferably 96 to 100%. Notably, the density of the elastic layer 21 preferably gradually becomes higher from both the longitudinal end parts of the roller part 20 toward the longitudinal center part thereof.

In the toner conveyance roller 30 of the present invention, the shape of the elastic layer 21 is not needed to be a crown shape in which its maximum diameter is largely increased, but space-saving can be achieved. Notably, while the shape of the elastic layer 21 is preferably a cylindrical shape as shown in FIG. 1 with which space-saving can be most achieved, it is not specially limited as long as the effects of the present invention can be obtained, but formation into a crown shape with a small crown amount, a reverse crown shape, or the like is possible (in the present invention, each of such shapes and a cylindrical shape is referred to as "substantially cylindrical shape").

Notably, according to the toner conveyance roller of the present invention, as represented by Examples mentioned later, since the volume of the elastic layer can be made small by not setting a crown shape in which its maximum diameter is largely increased, an amount of toner remaining on the toner conveyance roller after the usage can be reduced, which enables loss of toner to be reduced.

In the toner conveyance roller 30 of the present invention, the density ratio ($D_c/D_e$) of the density ($D_c$) of the elastic layer 21 in the longitudinal center part of the roller part 20 relative to the density ($D_e$) of the elastic layer 21 in both the longitudinal end parts thereof is preferably 104 to 126%. With the density ratio ($D_c/D_e$) within this range, as represented by Examples mentioned later, the difference between the pressing force with respect to the longitudinal end part of the developing roller and the pressing force with respect to the longitudinal center part thereof in the toner conveyance roller can be made further small, which enables image quality to be further improved. The density ratio ($D_c/D_e$) is further preferably 104 to 120%, particularly preferably 113 to 120%. The density ($D_e$) of the elastic layer 21 in both the longitudinal end parts is the average density of the elastic layer 21 in the regions e and e' near both the longitudinal ends E and E'. The regions e and e' are preferably in ranges of 50 mm from both the longitudinal ends E and E' (in 50 mm of both the longitudinal end parts), respectively. Moreover, the density ($D_c$) of the elastic layer 21 in the longitudinal center part is the average density of the elastic layer 21 in the region c near the longitudinal center C, and the region c is preferably in a range of 50 mm around the longitudinal center C (in 50 mm of the longitudinal center part).

The elastic foaming body used for the elastic layer 21 of the toner conveyance roller 30 of the present invention is not specially limited. For example, examples thereof can include polyurethane foam, silicone rubber foam, ethylene-propylene rubber foam, acrylonitrile-butadiene rubber foam and the like. Above all, the polyurethane foam is preferable. The foaming body structure may have any of an open-cell property and a closed-cell property.

The polyurethane material for forming the polyurethane foam is not specially limited as long as the resin contains a urethane bond. A known polyol component can be used, and, for example, polyether polyol, polytetramethylene ether glycol, polyol of THF-alkylene oxide copolymer, polyester polyol, acryl polyol, polyolefin polyol, a partially saponified compound of ethylene-vinyl acetate copolymer, phosphate-based polyol, halogen-containing polyol and the like can be preferably used. A known isocyanate component can be used, and TDI, MDI, crude MDI (polymeric MDI), modified MDI and the like, which are for general use, can be used.

In addition to these polyurethane raw materials, to the polyurethane material, a crosslinking agent, a foaming agent (water, low-boiling point substances, gas bodies and the like), a surfactant, a catalyst and the like can be added as needed, and thereby, a desired structure can be made. Moreover, a known additive such as a flame retardant, a filler material and a crosslinking agent can be properly used. Moreover, in order to give the toner conveyance roller conductivity, a known conductive agent such as an ion conductive agent and an electron conductive agent is desired to be blended. Examples of the ion conductive agent can include ammonium salts such as a perchlorate salt, a chlorate salt, a hydrochloride salt, a bromate salt, an iodate salt, a fluoroborate acid salt, a sulfate salt, an ethylsulfate salt, a carboxylate salt and a sulfonate salt, for example, tetraethylammonium, tetrabutylammonium, dodecyltrimethylammonium (for example, lauryltrimethylammonium), hexadecyltrimethylammonium, octadecyltrimethylammonium (for example, stearyltrimethylammonium), benzyltrimethylammonium, (modified-fatty-acid)dimethylethylammonium and the like, a perchlorate salt, a chlorate salt, a hydrochloride salt, a bromate salt, an iodate salt, a fluoroborate acid salt, a trifluoromethylsulfonate salt, a sulfonate salt and the like of alkali metal and alkali earth metal such as lithium, sodium, potassium, calcium and magnesium. Moreover, examples of the electron conductive agent can include: conductive carbon such as Ketjen black and acetylene black; carbon for rubber such as SAF, ISAF, HAF, FEF, GPF, SRF, FT and MT; carbon for ink, pyrolytic carbon, natural graphite and artificial graphite which undergo oxidation processing; conductive metal oxide such as tin oxide, titanium oxide and zinc oxide; and metal such as nickel, copper, silver and germanium.

A method for obtaining a foaming body constituting the roller using the above-mentioned polyurethane material is not limited, but a known method such as a method for chemical foaming using the above-mentioned foaming agent, and a method for foaming by mechanically sucking air into a vortex in molding can be properly selected and used.

The material of the shaft part in the toner conveyance roller of the present invention is not specially limited. For example, a shaft material which is solid or hollow and composed of metal such as iron, stainless steel and aluminum, a resin such as rigid plastics, or the like can be used.

In particular, a shaft material composed of conductive metal or conductive plastics is preferable.

A method for manufacturing the toner conveyance roller of the present invention is not specially limited as long as it can give the elastic layer the above-mentioned characteristics. In order to easily manufacture the toner conveyance roller of the present invention, for example, the method shown below can be used.

Figure 2A:
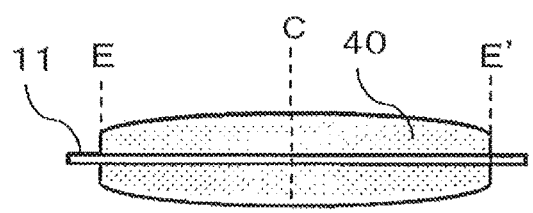
FIGS. 2A, 2B, 2C and 2D present schematic cross-sectional views showing a representative example of a method for manufacturing the toner conveyance roller of the present invention.

FIGS. 2A, 2B, 2C and 2D present schematic cross-sectional views showing a representative example of the method for manufacturing the toner conveyance roller of the present invention. First, as shown in FIG. 2A, an elastic foaming body 40 for forming the elastic layer 21 of the roller part 20 is processed into a crown shape in which the outer diameter of the longitudinal center part is larger than the outer diameter of both the longitudinal end parts.

Figure 2B:

As to the processing into the crown shape, an elastic foaming body in a prismatic shape or the like may be processed by grinding processing, or an elastic foaming body may be prepared in a crown-shaped metal mold. Typically, the shaft part 11 is inserted into the elastic foaming body 40 before the processing by a usual method. Between the shaft part 11 and the elastic foaming body 40, an adhesive layer for adhesively fixing the same to the elastic foaming body 40 may be formed, and another layer such as a rubber layer (not shown) may be inside the elastic foaming body 40. Next, as shown in FIG. 2B, the elastic foaming body 40 is press-fitted into a substantially cylindrical tubular body 50 to compress the elastic foaming body 40 into a substantially cylindrical shape. The material of the tubular body 50 is not specially limited, but a pipe made of metal and/or a resin, and the like can be cited. As mentioned later, since it is heated in the next step, it is preferable a pipe made of metal such as aluminum, copper and iron, which are excellent in thermal conductivity, and its inner surface may be coated with a fluorine resin or the like such that the elastic foaming body 40 is easily press-fitted thereinto. Moreover, the inner diameter of the tubular body 50 is not specially limited as long as it is smaller than the maximum outer diameter of the elastic foaming body 40, but it can be designed in relation to the desired density and hardness of the elastic layer 21. It is preferably the same as or smaller than the minimum outer diameter of the elastic foaming body 40 such that the elastic foaming body 40 is molded into the shape of the tubular body 50. While the shape of the tubular body 50 is cylindrical in FIG. 2B, the shape of the interior thereof can be designed as a crown shape with a small crown amount, a reverse crown shape or the like (that is, a substantially cylindrical shape) to meet the desired shape of the elastic layer 21.

Figure 2C:
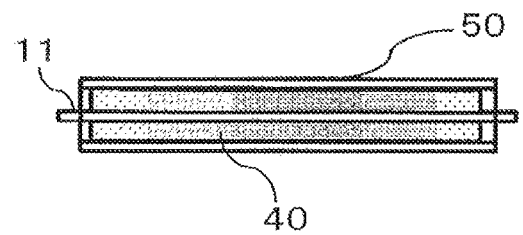
Figure 2D:
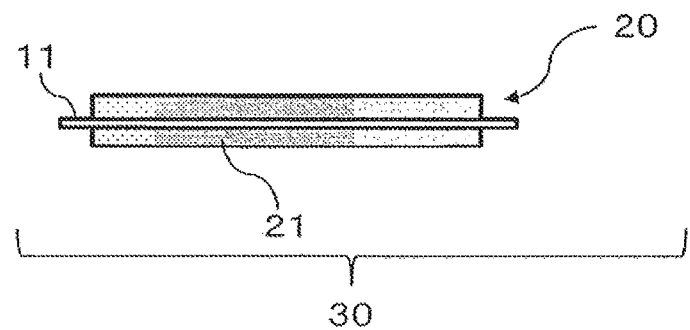

Next, as shown in FIG. 2C, in the state where the elastic foaming body 40 is press-fitted into the tubular body 50, the tubular body 50 is heated from its outer circumference. The heating method is not specially limited, but a known method can be used. The heating temperature can be properly adjusted depending on the material of the elastic foaming body 40. In the case of polyurethane foam, 150 to 250° C. is preferable. By doing so, the elastic foaming body 40 is heat-pressed and molded into the shape of the interior of the tubular body 50. After the heating, as shown in FIG. 2D, the elastic foaming body 40 is taken out of the tubular body 50 to obtain the toner conveyance roller 30 having the roller part 20 in which the elastic layer 21 is formed. According to this method, the crown-shaped elastic foaming body 40 is heat-pressed into a substantially cylindrical shape, thereby, the compression rate of the elastic foaming body in the longitudinal center part is made higher than the compression rate thereof in both the longitudinal end parts, and thus, the toner conveyance roller of the present invention in which the density of the elastic layer is higher in the longitudinal center part of the roller part than in both the longitudinal end parts thereof can be easily manufactured.

In the manufacturing method of the present invention, the crown amount of the crown shape of the elastic foaming body 40 is not specially limited, but can be properly configured. In order to set the difference between the density of the elastic layer 21 in both the longitudinal end parts of the roller part 20 and the density in the longitudinal center part thereof to fall within the preferable range, the crown amount of the crown shape of the elastic foaming body 40 is preferably 0.2 to 1.0 mm, further preferably 0.2 to 0.8 mm, particularly preferably 0.6 to 0.8 mm. Notably, in the present invention, the crown amount is set as the difference between the outer diameter at the positions of both the longitudinal ends E and E' of the elastic foaming body 40 and the outer diameter at the position of the longitudinal center C thereof in FIG. 2A.

EXAMPLES

Hereafter, the present invention is described on the basis of Examples.

(I) Evaluation of Image Quality
(1) Preparation of Rollers

By the method presented in FIGS. 2A, 2B, 2C and 2D, using a cylindrical tubular body with 13 mm of inner diameter, toner conveyance rollers in Examples 1 to 7 and Comparative Example 1 each of which has a roller part with 13 mm of outer diameter and 220 mm of length and a shaft part with 5 mm of outer diameter were prepared from the respective elastic foaming bodies (polyurethane foam) with the crown amounts presented in Table 1. Table 1 presents the density of the elastic layer of each roller in both the longitudinal end parts (average density in each 50 mm of both the longitudinal end parts), the density thereof in the longitudinal center part (average density in 50 mm of the longitudinal center part), and the density ratio between these.

Figure 3A:
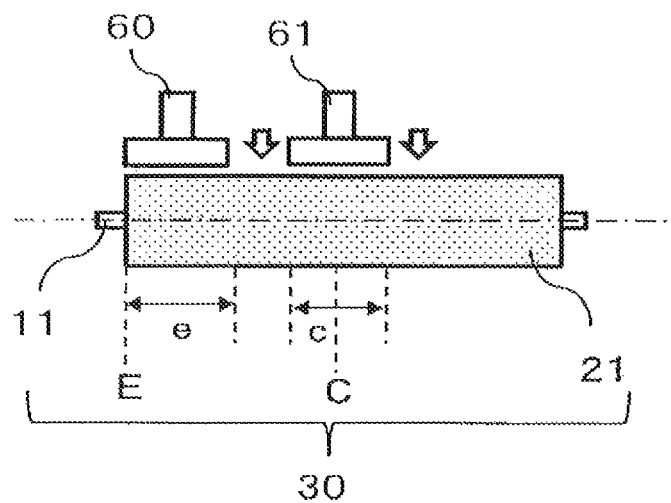
FIGS. 3A and 3B present schematic cross-sectional views for explaining a method for measuring pressing force in evaluation of the toner conveyance roller of the present invention.
Figure 3B:
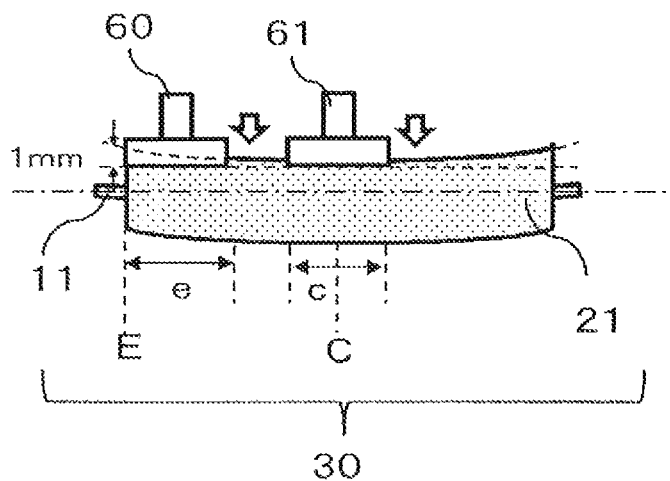

(2) Evaluation Method
(i) Ratio of Pressing Force of Elastic Layer in Longitudinal Center Part Relative to That in Both Longitudinal End Parts Evaluation of the pressing force of the toner conveyance roller was performed as follows. FIGS. 3A and 3B present schematic cross-sectional views for explaining a method for measuring the pressing force in the evaluation of the toner conveyance roller. As shown in the figure, the toner conveyance roller 30 was supported at both the end portions of the shaft part 11, and pressing bodies 60 and 61 each of which had 50 mm of length (in the longitudinal direction of the roller), 10 mm of width and 10 mm of thickness were disposed at the positions opposite to the region e in one end part of both the longitudinal end parts of the elastic layer 21 and the region c in the longitudinal center part thereof, to be parallel to the axis direction of the toner conveyance roller (FIG. 3A). Next, the pressing bodies 60 and 61 were moved at the speed of 10 mm/min in the cross-sectional direction of the roller part of the toner conveyance roller, and the pressing was performed until the pressing body 60 compressed the longitudinal end part of the roller part of the elastic layer 21 by 1 mm in the cross-sectional direction of the roller part (FIG. 3B). The pressing force in the longitudinal end part of the roller part of the elastic layer 21 was measured as the load exerted on the pressing body 60 in compressing. Moreover, the pressing force in the longitudinal center part of the elastic layer 21 was measured as the load exerted on the pressing body 61 at the time when the pressing body 61 compressed the longitudinal center part such that its pressing position in the cross-sectional direction of the roller part became the same as that of the pressing body 60 as shown in FIG. 3B (there was a case where the compressing distance became shorter due to bending of the shaft part 11 as shown in the figure). Table 1 presents the ratio of the pressing force in the longitudinal center part of the elastic layer 21 relative to the pressing force in the longitudinal end part thereof.

(ii) Image Quality

Each toner conveyance roller was attached to a corresponding image forming apparatus (printer), an image outputting test was performed, and a solid image that suffered blur caused by the poor property of scratching in the printed images was visually detected. One through which a solid image that suffered blur was not detected until reaching a predefined number of sheets was regarded as ⊚, one through which although a solid image that suffered blur had been detected at the time point of reaching the predefined number of sheets, it was not at a problematic level was regarded as ○, one through which although a solid image that suffered blur was detected in the early stage of the test, it was not at a problematic level was regarded as Δ, and one through which a problematic solid image that suffered blur was detected was regarded as X. Table 1 presents the results.

(II) Evaluation of Amount of Remaining Toner (1) Preparation of Rollers

According to a usual method, a roller for conveying toner in Comparative Example 2 which was in a crown shape with 13 mm of outer diameter of both the longitudinal end parts and 1 mm of crown amount and had a roller part having an elastic layer which had 220 mm of length and a shaft part with 5 mm of outer diameter was prepared.

(2) Evaluation Method

Each of the toner conveyance rollers in Example 5 which is mentioned above and Comparative Example 2 was attached and used to a corresponding image forming apparatus (printer), the weights of each toner conveyance roller before and after the usage were measured, and the amount of remaining toner in the elastic layer was obtained on the basis of the difference between those. Notably, the ratio of the pressing force of the elastic layer in the longitudinal center part relative to that in both the longitudinal end parts was measured similarly to the above. Table 2 presents the results.

TABLE 2

| | | Example 5 | Comparative Example 2 |
|---|---|---|---|
| Density of Elastic Layer (kg/m3) | End Part (De) | 112 | 107 |
| | Center Part (Dc) | 130 | 107 |

TABLE 1

| | Comparative Example 1 | Example 1 | Example 2 | Example 3 | Example 4 | Example 5 | Example 6 | Example 7 |
|---|---|---|---|---|---|---|---|---|
| Crown Amount of Elastic Foaming Body (mm) | 0 | 0.2 | 0.3 | 0.4 | 0.6 | 0.7 | 0.8 | 1.0 |
| Density of Elastic Layer (kg/m3) End Part (De) | 107 | 109 | 110 | 111 | 111 | 112 | 113 | 114 |
| Center Part (Dc) | 107 | 113 | 117 | 122 | 126 | 130 | 135 | 143 |
| Density Ratio of Elastic Layer (Dc/De) (%) | 100.0 | 104.0 | 106.8 | 110.4 | 113.5 | 116.0 | 119.4 | 125.4 |
| Pressing Force Ratio of Elastic Layer (Center Part/End Part) (%) | 88.6 | 89.1 | 91.9 | 92.4 | 96.2 | 97.7 | 99.2 | 102.7 |
| Image Quality | X | ○ | ○ | ○ | ⊚ | ⊚ | ⊚ | Δ |

(3) Evaluation Results

As presented in Table 1, as compared with the toner conveyance roller in Comparative Example 1 in which the density of the elastic layer was uniform over the whole area, it can be indicated that for the toner conveyance rollers in Examples 1 to 7 in each of which the density of the elastic layer was higher in the longitudinal center part than in both the longitudinal end parts, the ratio of the pressing force in the longitudinal center part relative to the pressing force in both the longitudinal end parts becomes close to 100%, and the difference between the pressing force with respect to the longitudinal end part of the developing roller and the pressing force with respect to the longitudinal center part thereof can be made small when the toner conveyance roller is pressed onto the developing roller. It is indicated that image quality in each of Examples 1 to 7 is improved as compared with that in Comparative Example 1, and it is indicated that the density ratio of the density of the elastic layer in the longitudinal center part relative to the density thereof in both the longitudinal end parts is preferably 104 to 126%. Moreover, likewise, it is indicated that the ratio of the pressing force in the longitudinal center part relative to the pressing force in both the longitudinal end parts is preferably 89 to 103%.

TABLE 2-continued

| | Example 5 | Comparative Example 2 |
|---|---|---|
| Outer Diameter of Elastic Layer (mm) End Part | 13.0 | 13.0 |
| Center Part | 13.0 | 14.0 |
| Pressing Force Ratio of Elastic Layer (Center Part/End Part) (%) | 97.7 | 98.2 |
| Volume of Elastic Layer (cm3) | 22.6 | 24.5 |
| Amount of Toner Remaining in Elastic Layer (g) | 10.3 | 10.8 |

(3) Evaluation Results

As presented in Table 2, while the ratios of the pressing force in Example 5 and Comparative Example 2 are approximately the same, the amount of remaining toner is less in Example 5, and it is indicated that the toner conveyance roller of the present invention can reduce loss of toner more as compared with the crown-shaped roller.

Notably, the present invention is not limited to the configuration of the embodiment and Examples mentioned above, but it can be variously modified without departing from the spirit of the present invention.

INDUSTRIAL APPLICABILITY

According to the present invention, a toner conveyance roller can be provided which can be used for an image forming apparatus such as a copying machine and a printer and with which image quality can be improved and space-saving designing is enabled.

REFERENCE SIGNS LIST

11 Shaft part
20 Roller part
21 Elastic layer
30 Toner conveyance roller
40 Elastic foaming body
50 Tubular body

The invention claimed is:

1. A toner conveyance roller for an image forming apparatus including a toner image forming mechanism including a developing roller and the toner conveyance roller which is arranged opposite to the developing roller and used for supplying and scraping toner, wherein
the toner conveyance roller has a roller part and a shaft part, the roller part includes a substantially cylindrical elastic layer composed of an elastic foaming body on a surface of the roller part, the elastic layer is formed by heat-pressing the elastic foaming body after foam curing such that the compression rate of the elastic foaming body in the longitudinal center part of the roller part is made higher than the compression rate thereof in both the longitudinal end parts, a density of the elastic layer is higher in a longitudinal center part of the roller part than in both longitudinal end parts thereof, and the ratio of the pressing force of the elastic layer in the longitudinal center part of the roller part relative to the pressing force of the elastic layer in the longitudinal end part thereof is within a range of 89% to 99.2%.

2. The toner conveyance roller according to claim 1, wherein a density ratio ($D_c/D_e$) of a density ($D_c$) of the elastic layer in the longitudinal center part of the roller part relative to a density ($D_e$) of the elastic layer in both the longitudinal end parts thereof is within a range of 104% to 119.4%.

3. The toner conveyance roller according to claim 2, wherein the density ($D_e$) is an average density of the elastic layer in each of 50 mm segments, each of which are included in respective longitudinal end parts of the roller part, and the density ($D_c$) is an average density of the elastic layer in another 50 mm segment which includes the longitudinal center part of the roller part.

4. The toner conveyance roller according to claim 1, wherein the elastic layer is a layer composed of polyurethane foam.

5. A method for manufacturing the toner conveyance roller according to claim 1, the method comprising:
a step of processing an elastic foaming body for forming the elastic layer of the roller part into a crown shape in which an outer diameter in the longitudinal center part is larger than an outer diameter in both the longitudinal end parts; and
a step of press-fitting the crown-shaped elastic foaming body into a substantially cylindrical tubular body, and after heating the tubular body, taking out the elastic foaming body to form the elastic layer.

6. The method for manufacturing the toner conveyance roller according to claim 5, wherein a crown amount of the crown shape of the elastic foaming body (difference between the outer diameter of the elastic foaming body in both the longitudinal ends and the outer diameter thereof in the longitudinal center) is in a range of 0.2 to 0.8 mm.

* * * * *